Figure 1:
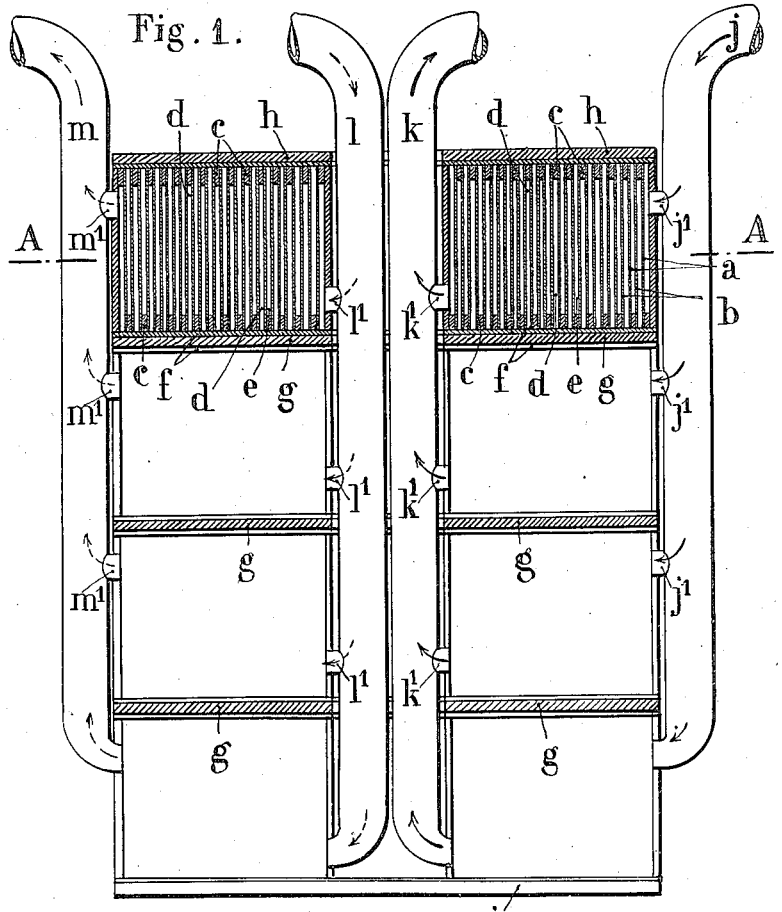

J. MÉRIE.
MILK STERILIZING APPARATUS.
APPLICATION FILED DEC. 18, 1912.

1,129,704.

Patented Feb. 23, 1915.

2 SHEETS—SHEET 1.

WITNESSES:
W. C. Baker
B. Joffe

INVENTOR:
Jean Mérie,
BY
ATTORNEYS.

J. MÉRIE.
MILK STERILIZING APPARATUS.
APPLICATION FILED DEC. 18, 1912.

1,129,704.

Patented Feb. 23, 1915.
2 SHEETS—SHEET 2.

WITNESSES:

INVENTOR:
Jean Mérie
BY
ATTORNEYS

UNITED STATES PATENT OFFICE.

JEAN MÉRIE, OF PARIS, FRANCE.

MILK-STERILIZING APPARATUS.

1,129,704. Specification of Letters Patent. Patented Feb. 23, 1915.

Application filed December 18, 1912. Serial No. 737,412.

*To all whom it may concern:*

Be it known that I, JEAN MÉRIE, of 135 Rue d'Alésia, in the city of Paris, Republic of France, engineer, have invented an Improved Milk-Sterilizing Apparatus, of which the following is a full, clear, and exact description.

The methods heretofore employed for preventing the fermentation and decomposition of milk to enable it to be kept for a time for storage or for transportation do not give entirely satisfactory results. The addition of antiseptics is a method usually condemned. "Pasteurization" is insufficient to preserve milk for a long time, and does not insure that it is absolutely innocuous. It is therefore necessary to employ sterilization but the process of sterilization as heretofore carried out presents numerous disadvantages: it imparts a "cooked" taste to the milk, causes it to assume a slightly red tint, transforms a part of the fatty matters into butter and decreases the digestive properties of the milk.

The present invention relates to an improved process for treating milk whereby the hereinbefore mentioned disadvantages are entirely avoided. This process is substantially characterized by the following points:

1. The milk is progressively heated to the temperature of sterilization by passing through a heat exchanger and through a calefactor where it is submitted to a pressure sufficient to balance the tension of the gases; the cross sectional area of the milk conveying conduits or passages being constant throughout their length. In this way, at no moment whatever can be produced (*a*) stoppages in the circulation of the whole mass of the milk, stoppages which might cause the cooking of the milk; (*b*) expansions which would determine the liberation of the gases contained in the milk and would deprive it of its properties.

2. The milk is never in direct contact with the source of heat. It is progressively heated first by the heat carried away by the milk already sterilized and then by its passage in a calefactor where it remains until the temperature of sterilization is reached; in this calefactor a mass of water is interposed between the source of heat and the milk, thus avoiding the decomposition of the milk by direct thermal action. By means of these arrangements, there is always only a difference of temperature of a few degrees between the milk and the wall giving up the heat to the same. The milk treated in these conditions preserves its characteristic color, its natural taste and all its digestive properties. The sterilization obtained is however complete.

The device preferably used for putting into practice this improved process comprises a sterilizer in combination with a pump and a closed tank or compressor. The pump is adapted to feed the sterilizer; the compressor-tank serves for the regulation of the pressure. The sterilizing apparatus is formed by the combination of two known elements but constructed in such a way that their conduits or passages and the piping which connect them is of equivalent cross section, that is to say constant throughout the path of the milk. These two elements are:

1. A heat exchanging apparatus constituted by two sheets of copper wound around a central core, so as to form two independent conduits or passages open the one toward the top and the other toward the bottom of the apparatus. The first of these conduits serves for the circulation of the hot liquid and the second for the circulation of the cold liquid which progresses in reverse direction to that of the hot liquid. One of the main features of the present invention consists in the improvement in the sizes and shape of the spiral heat exchanger, so that it may be easily handled, that access may be had to all its parts and that it can be readily cleaned which is of the greatest importance in the dairy industry. The conduits or passages of the heat exchanger are of large area but of small height so that the apparatus may be easily and completely cleaned and capable of withstanding moderately high pressures. The heat exchanging apparatus should preferably consist of a plurality of similar elements connected together first in parallel then in series.

2. A calefactor constituted by a water bath filled with water in which is immersed a coil constituted by horizontal tubes set on two opposite walls and in communication together through removable doors forming successive intercommunication for the whole of the tubes. The water-bath must form a powerful thermal accumulator for insuring the regularity of the heating; for that purpose it must be constructed so as to have a capacity equal to six times that of the coil.

Figure 2:
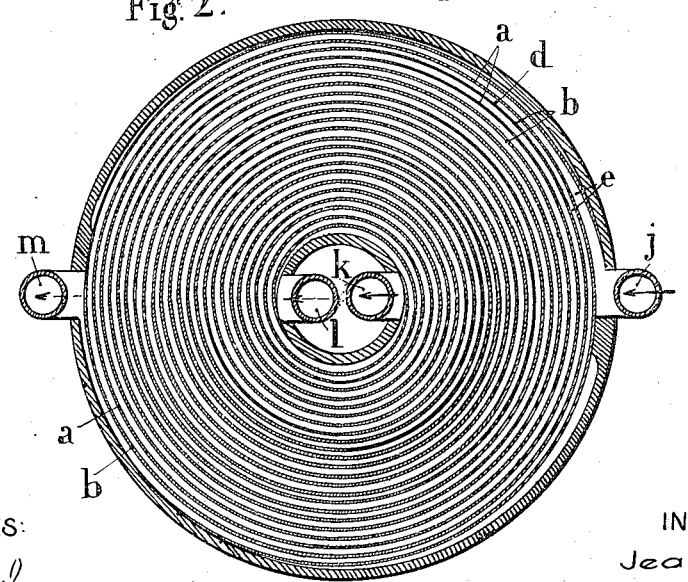
Figure 3:
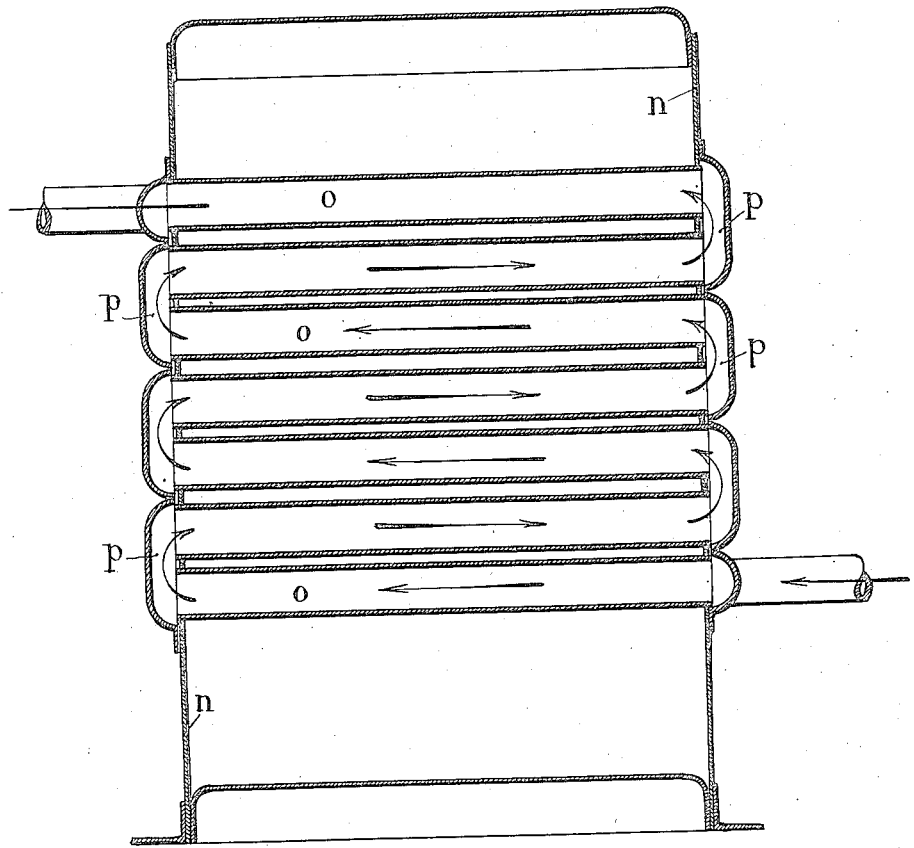
Figure 4:
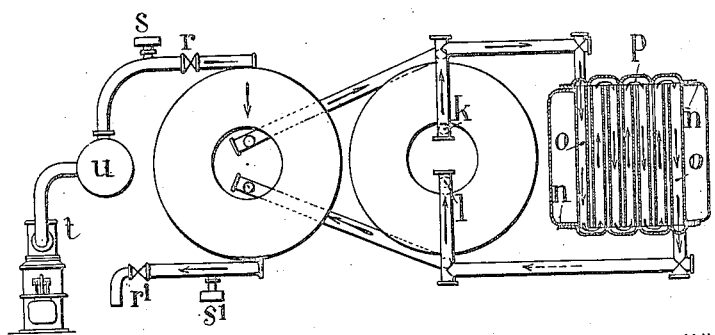

One form of the apparatus is illustrated in the accompanying drawings, in which:

Figure 1 is a vertical section of the heat exchanging apparatus. Fig. 2 is a horizontal section made according to line A—A of Fig. 1. Fig. 3 is a horizontal section of the calefactor. Fig. 4 is a diagrammatic view showing the circulation of the milk.

As illustrated in the drawings, the heat exchanging apparatus consists of a plurality of similar elements connected together first in parallel then in series; each element is constituted by two sheets of tinned copper $a$ and $b$, wound in spiral. These sheets are connected together by copper strips $c$ soldered with the same and closing the element at the top and bottom alternately, as shown in Fig. 1. In this way the element comprises two distinct conduits or passages $d$ and $e$ open the one toward the bottom and the other toward the top. Two consecutive elements are separated by two sheets of India rubber $f$ or other elastic or plastic material between which is arranged a copper plate $g$. Above and below each series of elements are arranged two strong plates $h$ and $i$ which may be connected and held together by means of bolts which pass through the whole assemblage.

$j$ is the inlet-pipe leading in the milk to be sterilized into the passage $e$ of each element through inlets $j^1$. The milk passes right through the passage $e$ and out through outlets $k^1$ and is led away to the calefactor through a pipe $k$. The sterilized milk is delivered from the calefactor by means of a pipe $l$ and is led through inlets $l^1$ into the passages $d$; after passing through said passages $d$ it is led away by a pipe $m$.

The calefactor is constituted by a square boiler $n$ which may be heated in any suitable manner. This boiler is traversed by parallel tubes $o$ exteriorly connected by detachable connections $p$ which enable the tubes to be cleaned. The tubes thus connected together form a coil immersed in the water of the boiler. This water forms a water-bath or heat accumulator of large volume whose temperature may be easily adjusted so as to remain constant.

The liquid to be sterilized coming from the heat-exchanging apparatus enters at one end of the coil $o$ and passes out at its other end without stoppage. The constant speed circulation in the heat-exchanging apparatus and in the calefactor is insured by an invariable pressure within the passages whose cross section is equivalent as well in the two parts of the apparatus as in the piping connecting them. The running off of the liquid under invariable pressure is obtained by means of a pump $t$, a tank $u$ and two cocks $r$ and $r^1$ respectively placed the one at the inlet and the other at the outlet of the apparatus. Each cock is provided with a control gage $s$ and $s^1$. The inlet cock being wide open and the gage indicating a determined pressure, according to the temperature of sterilization, the operation of the outlet cock allows of adjusting the running off of the liquid to the outflow required. The pressure at the inlet being maintained invariable, the pressure at the outlet is also invariable for a constant outflow. The milk thus treated is then hermetically inclosed in metallic bottles or vessels which have been previously sterilized.

I claim:

1. In an apparatus for sterilizing milk, a heat-exchanging apparatus comprising a conduit in which passes the milk already sterilized, a conduit through which passes the milk to be sterilized, which is heated progressively, a calefactor, a conduit in said calefactor, the conduits of the heat-exchanging apparatus and that of the calefactor being of equal and constant cross section so as to avoid any expansion of the milk, and means to produce a constant pressure during the whole operation.

2. In an apparatus for sterilizing milk, a heat-exchanging apparatus comprising a conduit having the form of a spiral, in which passes the milk already sterilized, a conduit having the form of a spiral through which passes the milk to be sterilized, which is heated progressively, a calefactor, a conduit in said calefactor, the conduits of the heat-exchanging apparatus and that of the calefactor being of equal and constant cross section so as to avoid any expansion of the milk, and means to produce a constant pressure during the whole operation.

3. In an apparatus for sterilizing milk, a heat-exchanging apparatus comprising a conduit in which passes the milk already sterilized, a conduit through which passes the milk to be sterilized, which is heated progressively, a calefactor, a conduit in said calefactor heated in a water-bath, the conduits of the heat-exchanging apparatus and that of the calefactor being of equal and constant cross section so as to avoid any expansion of the milk, and means to produce a constant pressure during the whole operation.

4. In an apparatus for sterilizing milk, a heat-exchanging apparatus, a calefactor, a plurality of similar elements in said heat exchanging apparatus, and plates covered with elastic sheets separating said elements.

5. In an apparatus for sterilizing milk, a heat exchanger having conduits, a water bath calefactor, and tubes in said calefactor forming a conduit for the circulation of the milk, said conduit having the same cross section as the conduits of the exchanger, and means for producing a constant pressure during the whole operation.

The foregoing specification of my improved milk sterilizing apparatus signed by me this third day of December 1912.

JEAN MÉRIE.

Witnesses:
  LUCIEN MEMMINGER,
  RENÉ THIRIOT.